(12) United States Patent
Morales, Jr.

(10) Patent No.: US 9,216,482 B2
(45) Date of Patent: Dec. 22, 2015

(54) METHOD AND APPARATUS FOR INSTALLING ALARM SYSTEMS AND DOOR LOCKS

(71) Applicant: Richard Joseph Morales, Jr., Houma, LA (US)

(72) Inventor: Richard Joseph Morales, Jr., Houma, LA (US)

(73) Assignee: PUNCH POINT TOOLS, LLC, Houma, LA (US)

(*) Notice: Subject to any disclaimer, the term of this patent is extended or adjusted under 35 U.S.C. 154(b) by 106 days.

(21) Appl. No.: 14/231,813

(22) Filed: Apr. 1, 2014

(65) Prior Publication Data

US 2014/0290024 A1    Oct. 2, 2014

Related U.S. Application Data

(62) Division of application No. 12/964,068, filed on Dec. 9, 2010, now Pat. No. 8,684,426.

(60) Provisional application No. 61/363,904, filed on Jul. 13, 2010.

(51) Int. Cl.
| | |
|---|---|
| *E05B 17/00* | (2006.01) |
| *B23P 19/04* | (2006.01) |
| *E05B 17/06* | (2006.01) |
| *G08B 13/08* | (2006.01) |

(52) U.S. Cl.
CPC ............... *B23P 19/04* (2013.01); *E05B 17/06* (2013.01); *G08B 13/08* (2013.01); *Y10T 29/4978* (2015.01); *Y10T 29/49826* (2015.01); *Y10T 292/68* (2015.04); *Y10T 292/79* (2015.04)

(58) Field of Classification Search
CPC .................................. E05B 17/06; B23P 19/04
USPC ......... 292/340–346, 26–28; 29/428, 729, 739; 200/293–296
See application file for complete search history.

(56) References Cited

U.S. PATENT DOCUMENTS

| | | |
|---|---|---|
| 877,879 A | 1/1908 | Ash |
| 912,052 A | 12/1909 | Albertson |
| 948,598 A | 2/1910 | Stuart |
| 1,314,336 A | 8/1919 | Kemp |
| 1,315,716 A | 9/1919 | Forester |
| 1,377,458 A | 5/1921 | Block |
| 1,599,256 A | 9/1926 | Viehweger |
| 1,853,456 A | 4/1932 | Ross |
| 2,041,625 A | 5/1936 | Schmidt |
| 2,272,241 A | 2/1942 | Fendring |
| 2,572,999 A | 10/1951 | Elliott |
| 2,581,534 A | 1/1952 | Hungerford |

(Continued)

*Primary Examiner* — Minh Trinh
(74) *Attorney, Agent, or Firm* — Brett A. North; Garvey, Smith, Nehrbass & North, LLC

(57) ABSTRACT

A method and apparatus for marking positions for burglar alarm sensor elements on a door, the door attached to a frame having a header including comprising the steps of providing a marking apparatus the marking apparatus including an arm, a positioning member with a longitudinal centerline attached to the arm, and punch point attached to the positioning member, the punch point being aligned with the longitudinal centerline of the positioning member; at least partially opening the door; placing the positioning member in a hole in the header and closing the door; while the door is closed causing the positioning member to make a mark on the top of the door; and opening the door and removing the positioning member from the hole in the header; and causing an opening to be made in the door at the location of the mark.

16 Claims, 12 Drawing Sheets

(56) References Cited

U.S. PATENT DOCUMENTS

| | | | |
|---|---|---|---|
| 2,841,879 | A | 7/1958 | Lanski |
| 2,964,346 | A | 12/1960 | Check |
| 3,095,021 | A | 6/1963 | Schlage et al. |
| 3,107,934 | A | 10/1963 | Lee |
| 3,171,518 | A | 3/1965 | Bergmann |
| 3,330,525 | A | 7/1967 | Weinstein |
| 3,516,165 | A | 6/1970 | Pfeffer |
| 3,560,690 | A | 2/1971 | Luce et al. |
| 3,764,173 | A | 10/1973 | Griffith |
| 3,815,945 | A | 6/1974 | Lamphere |
| 4,005,890 | A | 2/1977 | Murch |
| 4,033,044 | A | 7/1977 | Michaels |
| 4,060,905 | A | 12/1977 | Light |
| 4,065,162 | A | 12/1977 | Schlage |
| 4,074,484 | A | 2/1978 | Queren |
| 4,174,862 | A | 11/1979 | Shane |
| 4,186,954 | A | 2/1980 | Detlefs |
| 4,211,442 | A | 7/1980 | Hansen |
| 4,363,173 | A | 12/1982 | Caldera |
| 4,369,994 | A | 1/1983 | Vorves |
| 4,382,337 | A | 5/1983 | Bendick |
| 4,389,790 | A | 6/1983 | Dunlap |
| 4,416,087 | A | 11/1983 | Ghatak |
| 4,453,751 | A | 6/1984 | Hamilton |
| 4,473,957 | A | 10/1984 | Faulkner |
| 4,499,666 | A | 2/1985 | Smith |
| 4,520,571 | A | 6/1985 | Harding |
| 4,527,337 | A | 7/1985 | Dreiling |
| 4,531,633 | A * | 7/1985 | Evans .................. E05B 17/06 206/230 |
| 4,547,009 | A | 10/1985 | Allen |
| 4,550,939 | A | 11/1985 | Babb, Jr. et al. |
| 4,649,652 | A | 3/1987 | Dickinson et al. |
| 4,684,160 | A | 8/1987 | Nelson |
| 4,687,165 | A | 8/1987 | Blackburn |
| 4,690,445 | A | 9/1987 | Hartley |
| 4,791,731 | A | 12/1988 | Dickinson et al. |
| 4,802,701 | A | 2/1989 | Mazie |
| 4,872,717 | A | 10/1989 | McEvoy et al. |
| 4,890,868 | A * | 1/1990 | Horvath ................ E05B 53/00 292/336.3 |
| 4,893,776 | A | 1/1990 | Floyd |
| 4,903,010 | A | 2/1990 | Greene |
| 4,993,168 | A | 2/1991 | Acuna |
| 5,004,879 | A | 4/1991 | Bernhardt et al. |
| 5,008,648 | A | 4/1991 | Conemac |
| 5,088,682 | A | 2/1992 | Gibbs |
| 5,088,780 | A | 2/1992 | Doherty |
| 5,109,611 | A | 5/1992 | Houck |
| 5,129,154 | A | 7/1992 | Aydelott |
| 5,375,339 | A | 12/1994 | Noel, Jr. |
| 5,476,020 | A | 12/1995 | Garvey et al. |
| 5,544,536 | A | 8/1996 | Kim |
| 5,547,239 | A * | 8/1996 | Allenbaugh ........ E05B 17/2003 292/346 |
| 5,570,917 | A | 11/1996 | Cutrer |
| D376,094 | S | 12/1996 | Hubbard |
| 5,593,194 | A | 1/1997 | Liau |
| 5,671,538 | A | 9/1997 | Lautenschlager |
| 5,769,473 | A | 6/1998 | Sovis |
| 5,772,380 | A | 6/1998 | Cloud et al. |
| 5,906,404 | A | 5/1999 | McGhee |
| 5,937,613 | A | 8/1999 | Vess, Sr. |
| 6,021,578 | A | 2/2000 | DeVingo |
| 6,077,000 | A | 6/2000 | Gibbons et al. |
| 6,185,831 | B1 | 2/2001 | Pluciennik |
| 6,286,803 | B1 | 9/2001 | Pellino et al. |
| 6,508,011 | B1 | 1/2003 | Lee |
| 6,612,629 | B2 | 9/2003 | O'Hanlon |
| 6,719,260 | B1 | 4/2004 | Hart |
| 6,837,527 | B1 | 1/2005 | Laurenzana |
| 6,871,566 | B2 | 3/2005 | Niwayama et al. |
| 6,907,675 | B1 | 6/2005 | Hutchings |
| 6,971,184 | B2 | 12/2005 | Prevost |
| 7,021,597 | B2 | 4/2006 | Vogt |
| 7,040,034 | B2 | 5/2006 | Nielson et al. |
| 7,095,320 | B2 | 8/2006 | Wang |
| 7,234,245 | B2 | 6/2007 | Tatum |
| 7,293,925 | B1 | 11/2007 | Sansevieno |
| 7,316,078 | B2 | 1/2008 | Hagman |
| D571,171 | S | 6/2008 | Albritton et al. |
| 7,396,055 | B2 | 7/2008 | Arneson et al. |
| 8,684,426 | B2 * | 4/2014 | Morales, Jr. ............ E05B 17/06 292/340 |
| 2004/0177527 | A1 | 9/2004 | Prevost |
| 2006/0096111 | A1 | 5/2006 | Dolenz et al. |
| 2007/0126576 | A1 | 6/2007 | Script et al. |

* cited by examiner

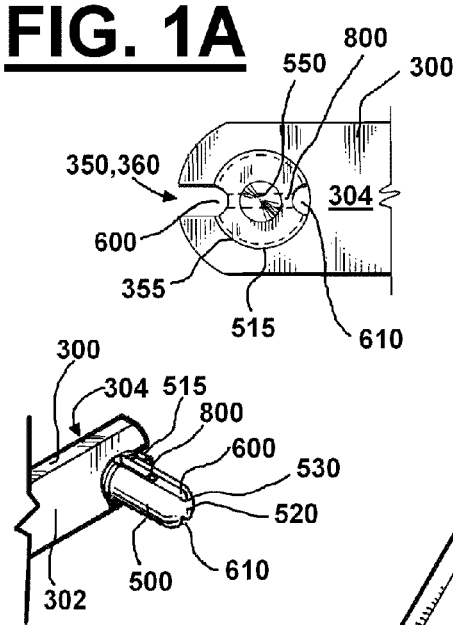
FIG. 1A
FIG. 1B
FIG. 1
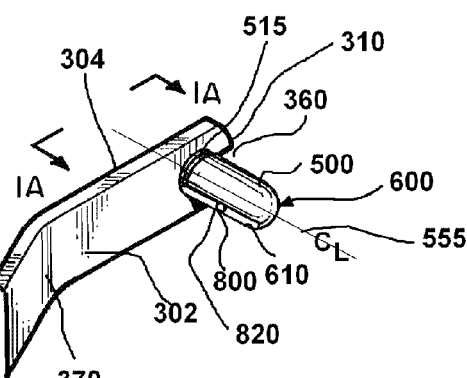
FIG. 2
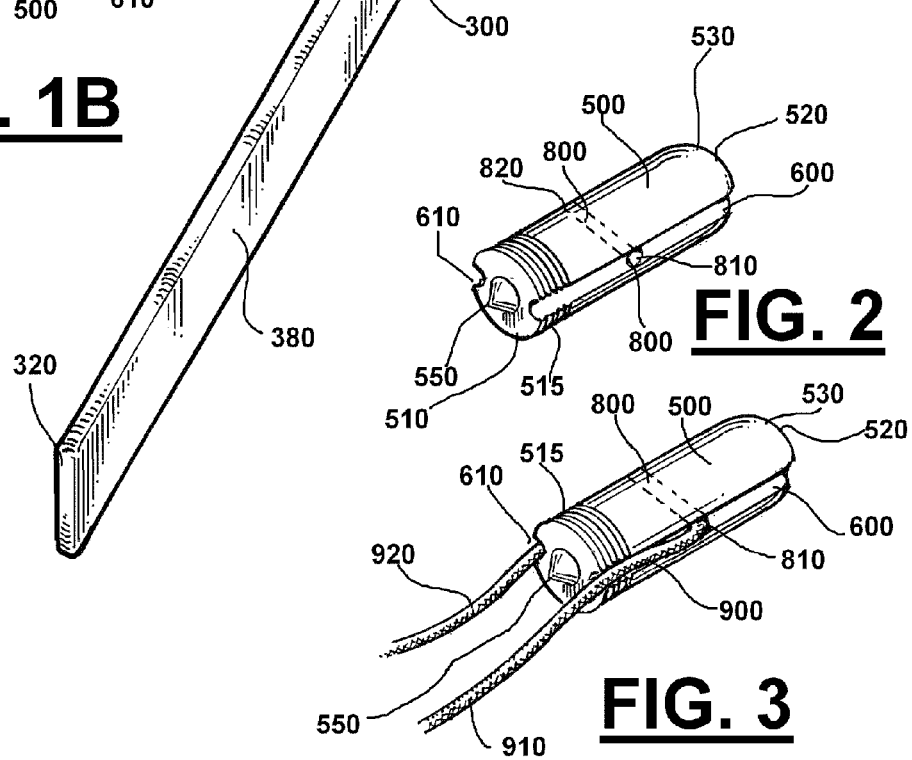
FIG. 3

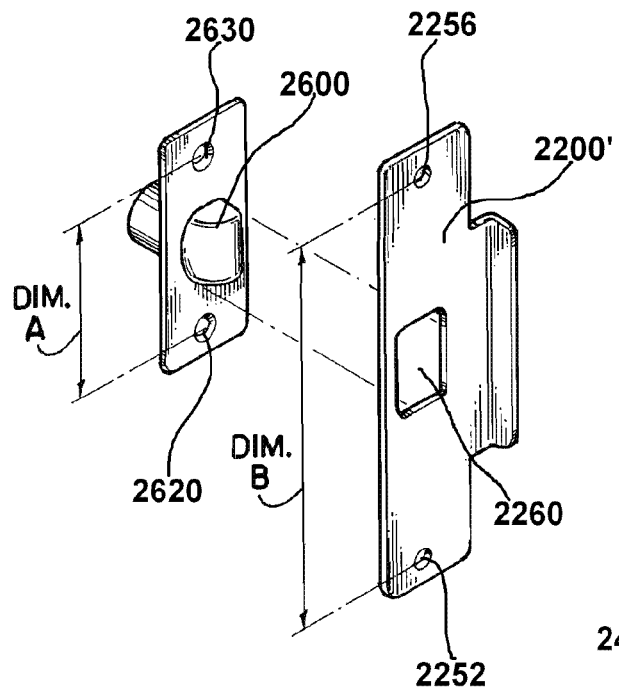
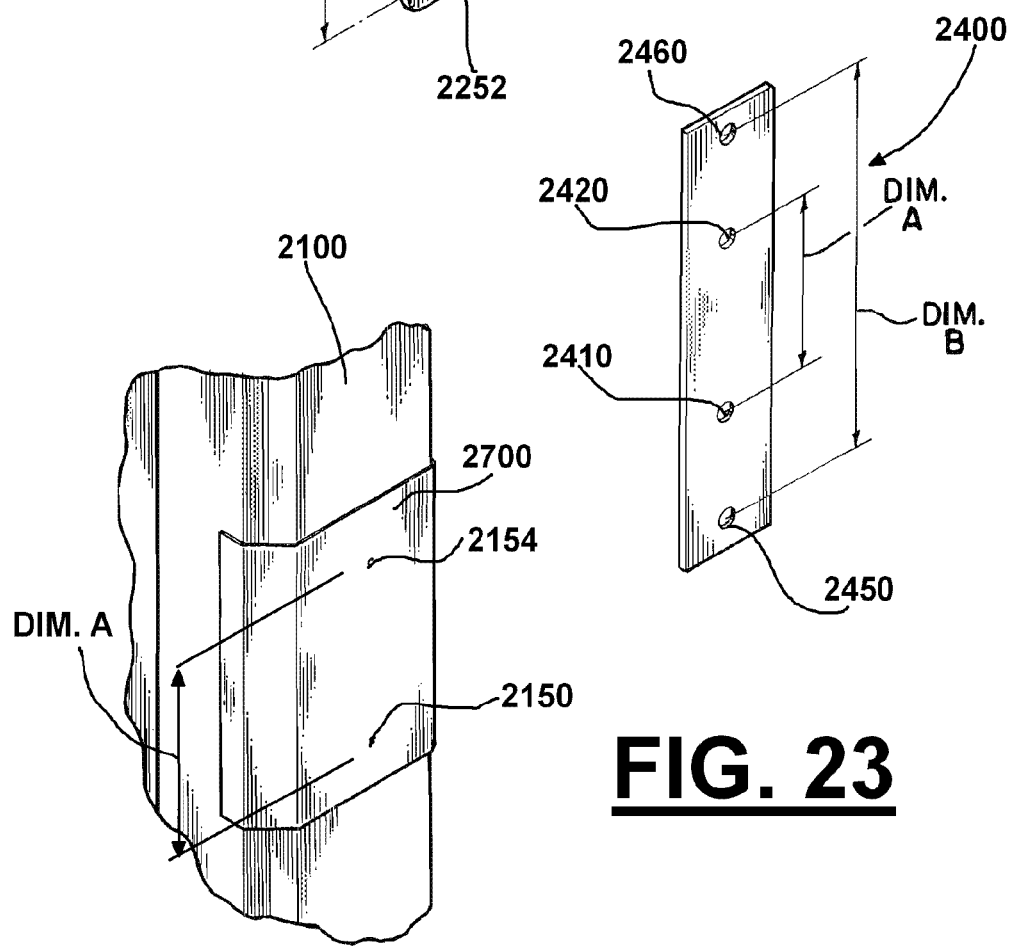
FIG. 22
FIG. 23

METHOD AND APPARATUS FOR INSTALLING ALARM SYSTEMS AND DOOR LOCKS

CROSS-REFERENCE TO RELATED APPLICATIONS

This is a divisional of U.S. patent application Ser. No. 12/964,068, filed Dec. 9, 2010 now U.S. Pat. No. 8,684,426, which was a non-provisional of U.S. Provisional Patent Application Ser. No. 61/363,904, filed Jul. 13, 2010. Priority of each of these applications is hereby claimed and each application is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND

The present invention relates to installation of burglar alarms and installation of door latches, and/or locks, and/or lock hardware.

There is a need to provide a quick and convenient method for marking holes to be drilled for installing burglar alarm sensor components, along with a method and apparatus for marking for door latches, and/or strike plates, and/or lock hardware.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

One embodiment provides a method and apparatus for marking positions for burglar alarm sensor elements on a door, the door attached to a frame having a header comprising the steps of: providing a marking apparatus the marking apparatus including an arm, a positioning member attached to the arm, the positioning member having a longitudinal centerline and a marking point, the marking point being aligned with the longitudinal centerline of the positioning member; at least partially opening the door; placing the positioning member in a hole in the header and closing the door; while the door is closed using the arm to cause the marking point of the positioning member to form a positioning mark on the top of the door; opening the door and removing the positioning member from the hole in the header; and causing an opening to be made in the door at the location of the positioning mark.

In one embodiment the positioning member has a groove and a contact wire is hanging from the hole in the header and the contact wire is placed in the groove.

In one embodiment the arm has first and second opposing sides, and the positioning member is located on the first side and the marking tip is located on the second side.

In one embodiment the arm of the positioning member is held in a substantially horizontal position during marking.

In one embodiment the marking tip is integral with the positioning member.

In one embodiment the arm has first and second opposing sides, and the marking tip is located a distance from the second side and such distance is adjustable related to the second side.

In one embodiment the positioning member is detachably connected to the arm via a plurality of threads.

In one embodiment the positioning member has a rounded tip.

In one embodiment the positioning member is bullet shaped, conically shaped, and/or cylindrically shaped.

In one embodiment the positioning member is frustoconically shaped.

In one embodiment the marking apparatus includes a plurality of interchangeable positioning members of different sizes and a user selects a particular positioning member to attach to the marking apparatus.

In one embodiment during marking there exists a gap between the top of the door and the header and at least part of the arm fits within the gap.

In one embodiment the arm includes first and second ends, the positioning member is attached on the first end, and a handle is attached to the arm on the second end.

In one embodiment the positioning member has a positioning surface which is cylindrically shaped and has an outer diameter which is slightly smaller than the hole in the header.

In one embodiment the positioning member has a groove and the arm has a notch which is aligned with the groove, and during step "c" a contact wire is hanging from the hole in the header and the contact wire is located in both the groove and the notch.

In one embodiment the arm has first and second opposing sides, and the positioning member is located on the first side and the marking tip is located on the first side.

In one embodiment the arm of the positioning member is held in a substantially vertical position while the positioning member is held in a substantially horizontal position.

In one embodiment the marking tip is integral with the positioning member.

In one embodiment the arm has first and second opposing sides, and the marking tip is located a distance from the first side and such distance is adjustable relative to the first side while the distance of the positioning member from the first side remains constant.

In one embodiment the positioning member is detachably connected to the arm via a plurality of threads.

In one embodiment the positioning member has a rounded tip.

In one embodiment the positioning member is bullet shaped, conically shaped, and/or cylindrically shaped.

In one embodiment the positioning member is frustoconically shaped.

In one embodiment the marking apparatus includes a plurality of interchangeable positioning members of different sizes and a user selects a particular positioning member to attach to the marking apparatus.

In one embodiment the arm includes first and second ends, the positioning member is attached on the first end, and a handle is attached to the arm on the second end.

In one embodiment the positioning member has a positioning surface which is cylindrically shaped and has an outer diameter which is slightly smaller than the cross bore in the door.

In one embodiment the positioning member is threadably connected to the arm and the marking tip is threadably connected to the positioning member.

One embodiment provides a method and apparatus for marking positions for burglar alarm sensor elements on a door, the door being attached to a frame comprising the steps of: providing a positioning member, the positioning member having a longitudinal centerline and a marking point, the marking point being aligned with the longitudinal centerline of the positioning member; at least partially opening the door; placing the positioning member in a hole in the frame; the act of closing the door in the door frame causing the marking point to make a mark on the door; opening the door and removing the positioning member from the hole in the frame; and causing an opening to be made in the door at the location of the positioning mark.

In one embodiment the door is slidably connected to the frame and the closing the door in the frame requires the door to slide parallel to the frame while the door is substantially parallel to the frame.

In one embodiment the positioning member includes a frictional element. In one embodiment the frictional element includes is flexible and includes first and second ends. In one embodiment the force application member is a rope, wire, chain, cord, or string.

In one embodiment the positioning member includes a plurality of grooves which are substantially parallel to the longitudinal centerline of the positioning member and the frictional element at least partially occupies one of the grooves.

In one embodiment the positioning member includes a bore which is substantially perpendicular to the longitudinal centering of the positioning member and the frictional element is threaded through the bore.

One embodiment provides a method and apparatus for marking positions for burglar alarm sensor elements on a window, the window being attached to a frame comprising the steps of: providing a positioning member, the positioning member having a longitudinal centerline and a marking point, the marking point being aligned with the longitudinal centerline of the positioning member; at least partially opening the window; placing the positioning member in a hole in the frame; the act of closing the window in the frame causing the marking point to make a mark on the window; opening the window and removing the positioning member from the hole in the frame; and causing an opening to be made in the window at the location of the positioning mark.

In one embodiment the positioning member includes a frictional element. In one embodiment the frictional element includes is flexible and includes first and second ends. In one embodiment the force application member is a rope, wire, chain, cord, or string.

In one embodiment the positioning member includes a plurality of grooves which are substantially parallel to the longitudinal centerline of the positioning member and the frictional element at least partially occupies one of the grooves.

In one embodiment the positioning member includes a bore which is substantially perpendicular to the longitudinal centering of the positioning member and the frictional element is threaded through the bore.

One embodiment provides a method and apparatus for marking positions for receiving or strike plates on door frame, the door being attached to a frame comprising the steps of: providing a first marking apparatus the first marking apparatus including a first marking point, placing the first marking apparatus in a first screw hole opening for a latch or deadbolt mechanism for the door; while the door is closed causing the first marking apparatus to make a first positioning mark on the door frame; opening the door and removing the first marking apparatus from the door; and using the first positioning mark to install a plate on the door frame for receiving the latch or dead bolt.

One embodiment includes the further steps of: after making the first positioning mark on the door frame, placing the first marking apparatus in a second screw hole opening for a latch or deadbolt mechanism for the door and placing the door in a closed state, and while the door is closed causing the first marking apparatus to make a second positioning mark on the door frame; opening the door and removing the first marking apparatus from the door; and using the first and second positioning marks to install a plate on the door frame for receiving the latch or dead bolt.

One embodiment provides a method and apparatus for marking positions for receiving or strike plates on door frame, the door being attached to a frame comprising the steps of: providing first and second marking apparatus the first and second marking apparatuses including first and second marking points, placing the first and second marking apparatuses in first and second screw hole openings for a latch or deadbolt mechanism for the door; while the door is closed causing the first and second marking apparatuses to make first and second positioning marks on the door frame; opening the door and removing the first and second marking apparatuses from the door; and using the first and second positioning marks to install a plate on the door frame for receiving the latch or dead bolt.

In any of the above embodiments a positioning template can be used with either the first or second positioning marks to install the plate on the door frame.

One embodiment provides a method and apparatus for marking positions for receiving or strike plates on door frame, the door being attached to a frame comprising the steps of: providing a first marking apparatus the first marking apparatus including a first marking point, placing the first marking apparatus in a first screw hole opening for a latch or deadbolt mechanism for the door; while the door is closed causing the first marking apparatus to make a first positioning mark on the door frame; opening the door and removing the first marking apparatus from the door; and using the first positioning mark to install a plate on the door frame for receiving the latch or dead bolt.

One embodiment includes the further steps of: after making the first positioning mark on the door frame, placing the first marking apparatus in a second screw hole opening for a latch or deadbolt mechanism for the door and placing the door in a closed state, and while the door is closed causing the first marking apparatus to make a second positioning mark on the door frame; opening the door and removing the first marking apparatus from the door; and using the first and second positioning marks to install a plate on the door frame for receiving the latch or dead bolt.

One embodiment provides a method and apparatus for marking positions for receiving or strike plates on door frame, the door being attached to a frame comprising the steps of: providing first and second marking apparatus the first and second marking apparatuses including first and second marking points, placing the first and second marking apparatuses in first and second screw hole openings for a latch or deadbolt mechanism for the door; while the door is closed causing the first and second marking apparatuses to make first and second positioning marks on the door frame; opening the door and removing the first and second marking apparatuses from the door; and using the first and second positioning marks to install a plate on the door frame for receiving the latch or dead bolt.

In any of the above embodiments a positioning template can be used with either the first or second positioning marks to install the plate on the door frame.

The drawings constitute a part of this specification and include exemplary embodiments to the invention, which may be embodied in various forms.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 shows perspective view marking apparatus with force bar and handle (positioning member attached to angled handle—marking point on bottom side and positioning member on top of handle, where positioning member has two longitudinal grooves and threads close to marking point).

FIG. 1A shows a view take from the lines A—A of FIG. 1 of the marking point of the positioning member of FIG. 1.

FIG. 1B is a perspective view of the positioning member of FIG. 1 where the positioning member has been rotating 90 degrees relative to the position shown in FIG. 1.

FIG. 2 shows perspective view of positioning member with marking point.

FIG. 3 shows perspective view of positioning member with marking point and pull cord.

FIG. 22 shows a strike plate having screw holes which do not match the screw holes of the latch, in such a case a template can be used.

FIG. 23 shows a strike plate template which can be used when the strike plate holes do not match the screw holes of the dead bolt or door lock, along with the positioning marks made in FIG. 20.

DETAILED DESCRIPTION

Figure 4:
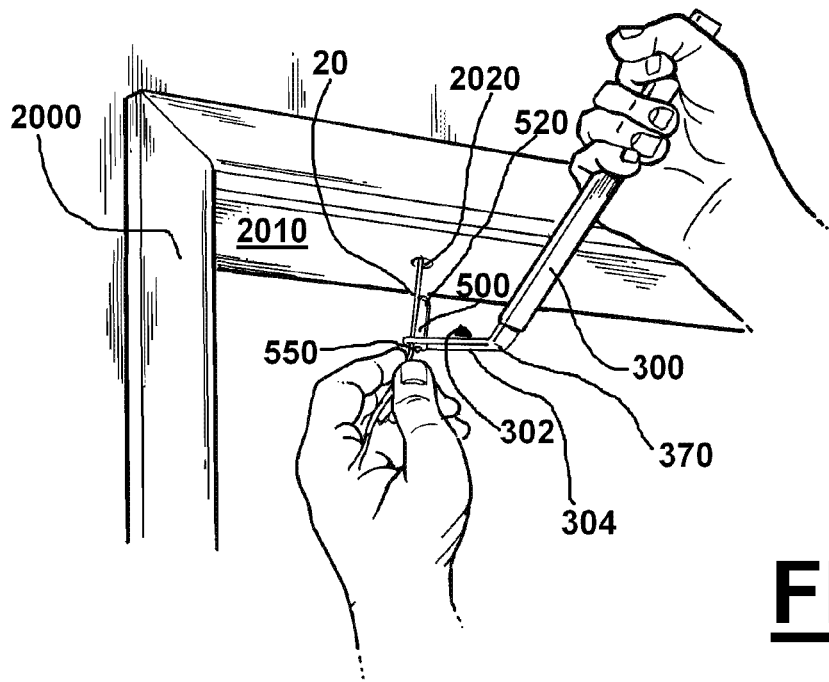
FIG. 4 shows marking apparatus with handle being placed in alarm sensor hole of top door frame with alarm sensor wire hanging down, and with door open.

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

It is to be understood that the marking apparatus 100 is applicable to any marking or punching use.

Force Bar with Positioning Member

FIG. 1 shows perspective view marking apparatus 100 with force bar 300 and handle (handle 200 can be the length of arm 300 following angle 370), and positioning member 500.

In this embodiment positioning member 500 can include marking point 550 on bottom side and rounded positioning member on top 520, with positioning member 500 having two longitudinal grooves (600, 610) and threads 515 close to marking point 550.

FIG. 1A shows a view taken from the lines A—A of FIG. 1 of the marking point 550 of positioning member 500.

FIG. 1B is a perspective view of positioning member 500 where positioning member 500 has been rotated 90 degrees relative to the position shown in FIG. 1. Positioning member is shown rotated to better illustrate the double grooves 600 and 610 (which can be seen in FIG. 1A, but not in FIG. 1). In FIG. 1B neither groove (600 or 610) lines up with notch 360 of arm 300. However, preferably during use either groove 600 or 610 will be lined up with notch 360 (as shown if FIGS. 1 and 1A).

In one embodiment marking device 100 can comprises a handle 200 (handle 200 can be the length of arm 300 following angle 370), arm 300, positioning member 500, and marking point 550. In embodiment positioning member 500 can be detachably connectable to arm 300.

In one embodiment marking point 550 can include a releasable marking substance such as paint, ink, dye, lead, graphite, and/or wax to increase the visibility of the mark left by marking point 550. In one embodiment marking point 550 can be similar to the point of a ball point ink pen, or a felt tip pen.

Arm 300 can include first end 310 and second end 320. Positioning 500 member can be detachably connected to second end 320. In a preferred embodiment positioning member 500 and marking point 550 can be longitudinally aligned with each other (and can be constructed from a single material).

Although not shown in the drawings, handle 200 can be non-parallel to and pivotally attached to first end 310.

On second end 320 of arm 300 can be opening 350 which can includes threaded area 355. In one embodiment opening 350 can include notch 360. First and second ends 310,320 of arm 300 can be rounded, flat, or angled.

Arm 300 (although illustrated as being generally rectangular) can be made in other shapes such as rounded, triangular, or other geometric cross sections which provide sufficient strength for the type of use contemplated, and can fit between the gap of a door and door jam.

Positioning member 500 can include first end 510, second end 520, and have a length "L". In a preferred embodiment first end 510 can be rounded, hemispherically shaped, curved, and/or pointed to allow for easy insertion into an opening. Second end 520 can include a pointed area 550 which can act as punch 700. In a preferred embodiment, positioning member 500 is symmetrically shaped with pointed area 550 being located in the longitudinal center line 555.

In one embodiment positioning member 500 can include threaded area 515 which threadably attaches to a threaded area 355 (of opening 350) of arm 300.

In various embodiments positioning member 500 can be attached to arm 300 by threading, wedging, or other attachment techniques. By making positioning member 500 detachably connectable to arm 300, it is possible to replace positioning member 500 easily as this is the primary point of wear on apparatus 100.

Positioning Member Itself without and with Pull Cord

FIG. 2 shows perspective view of positioning member 500 with marking point 550. FIG. 3 shows perspective view of positioning member 500 with marking point 550 and force application member 900.

In one embodiment positioning member 500 can include one or more longitudinal grooves 600, 610, and/or 620 (although groove 620 is not shown in the drawings) about its positioning surface 530. In one embodiment one groove 600 is provided. In one embodiment two grooves 600 and 610 are provided which are symmetrically spaced apart 180 degrees from each other. Although not shown in the drawings, in one embodiment three grooves 600, 610, and 620 are provided which are symmetrically spaced apart 120 degrees from each other.

FIG. 1A is a view of one embodiment of a positioning member 500 with marking point 550, with the positioning member having two longitudinal grooves 600 and 610 symmetrically spaced apart (180 degrees from each other). Grooves 600 and 610 allow for increased adjustability of marking point 550 related to top 302 of arm 300 as only one groove need be lined up with notch 360. With only single groove 600 positioning member 550 must be turned at least 360 degrees before groove 600 will line up with notch 360. With two vertical slots 600 and 610 positioning member 550 need only be turned 180 degrees before one of the two notched line up with groove 360. FIGS. 1, 1A, and 1B show relative positions of grooves 600 and 610 to notch 360.

Alarm Sensor Installation

The use of apparatus 100 for installing door alarm sensors is schematically illustrated in FIGS. 3-10.

FIG. 4 shows marking apparatus 100 with handle 300 being placed in alarm sensor hole 2020 of top door frame 2010 with alarm sensor wire 20 hanging down, and with door 2500 open. The header of door frame 2100 can have opening 2020 in the header which had been previously made (such as by a drill) a sensor wire 20 hanging from the opening 2020. Although not shown, header can have both a front and rear portion with a door jam towards the rear and weather stripping placed on the door jam.

Door frame 2000 can have a door sensor system 10 which includes contact wire 20 along with upper 12 and lower sensor 14 elements. Door sensor system 10 (which includes upper sensor 12 and sensor wire 20) can be installed in the upper portion of a door frame 2000 (see FIG. 10).

In FIG. 4 the sensor wire 20 has been placed in the groove 600 of positioning member 500 of apparatus 100. The vertical groove 600 and wire 20 face the rear of the door frame 2000. Positioning member 500 is preferably about the same size as the opening 2020 in the header 2010.

Figure 5:
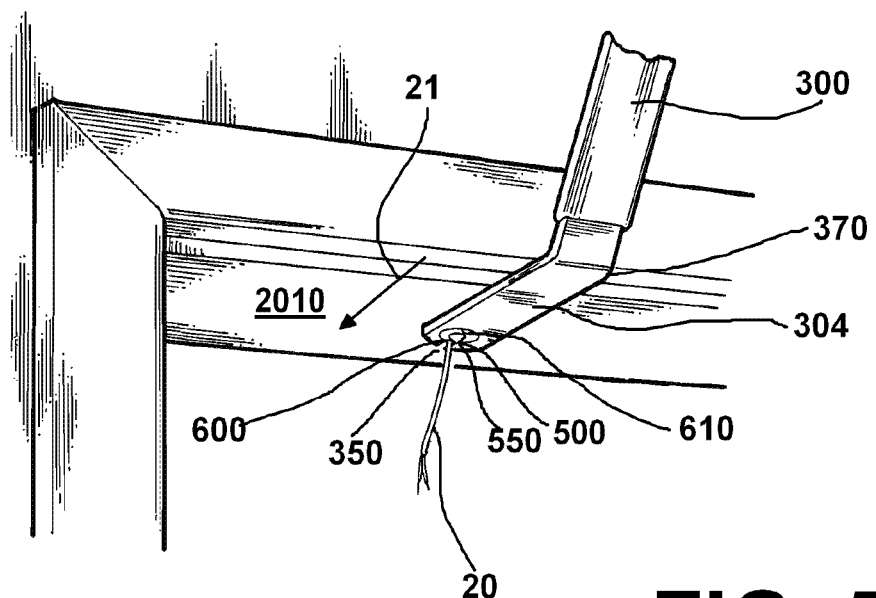
FIG. 5 shows marking apparatus with handle being now placed in alarm sensor hole of top door frame with alarm sensor wire hanging down, and with door open.

FIG. 5 shows positioning member 500 of marking apparatus 100 now placed in alarm sensor hole 2020 with alarm sensor wire 20 hanging down, and with door 2500 open. After positioning member 500 is placed in opening 2020 of header 2010, wire 20 still hangs down from opening 2020 but is located towards the rear of the header 2010 (schematically indicated by the arrow 21). Marking point 550 is now located about in the longitudinal center of opening 2020 for header 2010.

Figure 6:
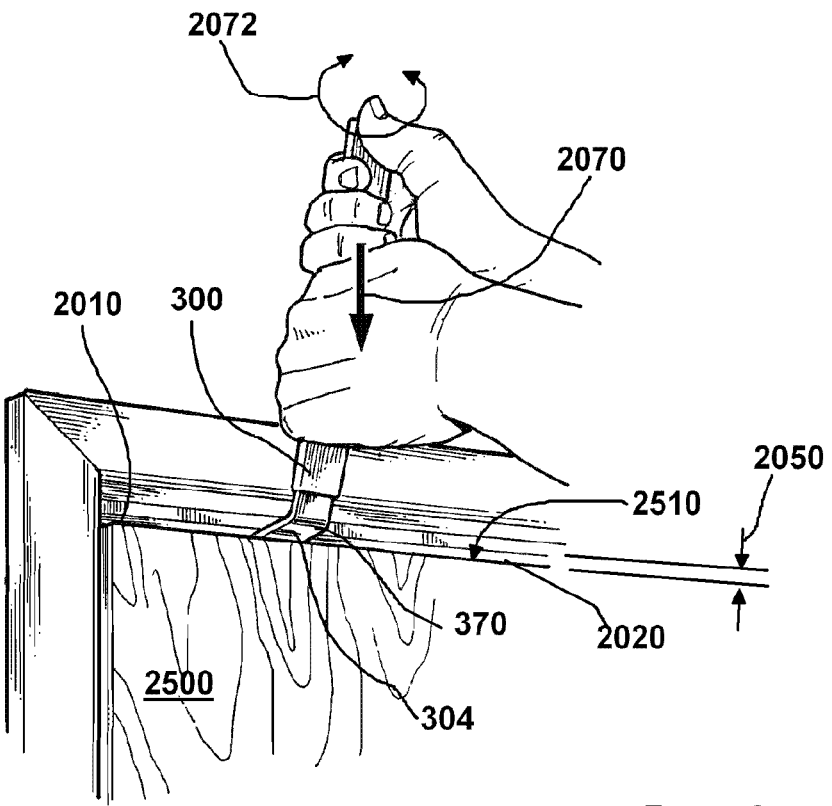
FIG. 6 shows door closed and force being applied on marking apparatus with handle while positioning member is in hole of top door frame with alarm sensor wire hanging down on other side of door, and with door closed.

FIG. 6 shows door 2500 in closed state and force (schematically indicated by arrow 2070) being applied on marking apparatus 100 with handle 300 while positioning member 500 is in hole 2020 of top door frame 2010 with alarm sensor wire 20 hanging down on other side of door 2500, and with door 2500 closed. Arm is located in gap 2050 between door 2500 and frame 2010. Preferably door 2500 is closed with door hardware (e.g., door knob 2504 ans strike plate 2200) on the door 2500/frame 2000 so that the door 2500 will lock in place in the strike plate 2200 (as the door will normally be used). When closed arm 300 of apparatus 100 can fit within the gap 2050 between the top 2510 of the door 2500 and the header 2010 of the door frame 2000. The hanging wire 20 also fits between the top 2510 of the door 2500 and the header 2010 of the door frame 2000 (on the top of the door) and between the rear of the door 2500 and the weather stripping 2004 in front of the jam 2006 (although not shown but located at the rear of the door 2500). Arrows 2072 schematically indicate that, in one embodiment, arm 300 can be pivoted somewhat about opening 2020 in header 2010 even when door 2500 is closed in door frame 2000.

Figure 7:
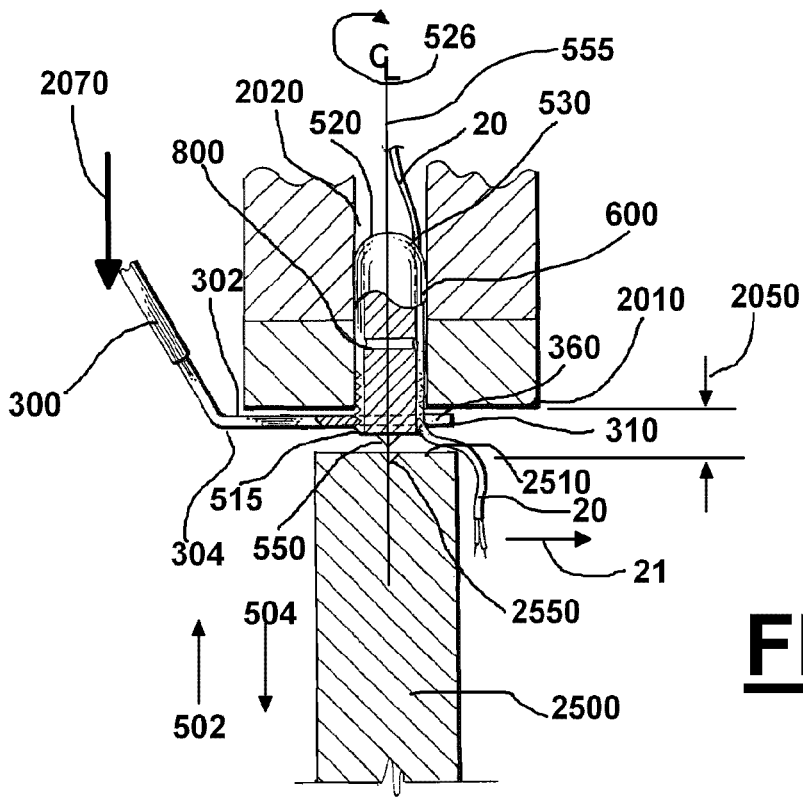
FIG. 7 shows a section view of the apparatus in FIG. 6 with door closed and force being applied on marking apparatus with handle while positioning member is in hole of top door frame with alarm sensor wire hanging down on other side of door, and with door closed.

FIG. 7 shows a section view of marking apparatus 100 with door 2500 closed and force (schematically indicated by arrow 2070) being applied on marking apparatus 100 with handle 300 while positioning member 500 is in hole 2020 of top door frame 2010 with alarm sensor wire 20 hanging down on other side of door 2500, and with door 2500 closed. Positioning surface 530 of positioning member 500 aligns positioning member 500 in the centerline CL of opening 2020 made in header 2010 of frame 2000. Marking point 550 can also being in the longitudinal centerline CL of positioning member 500 causing point 550 to be so aligned with centerline CL. When door 2500 is closed in frame 2000, pushing down on arm 300 (schematically indicated by arrow 2070) of apparatus 100 (shown in FIG. 39) causes point 550' to create a mark 2550 in door 2500. In this manner, when door 2500 is closed, mark 2550 is also aligned with centerline CL of opening 2020.

As shown in FIG. 7, wire 20 does not interfere with alignment of positioning member 500 because wire 20 can fit in groove 600 while positioning surface 530 aligns positioning member in opening 2020. Also shown in FIG. 7 arm 300 and marking point 550 of marking apparatus 100 can fit within gap 2050 between top 2510 of door 2500 and header 2010 of frame 2000. In some instances the distance between first end 510 of positioning member from bottom 304 of arm can be adjusted upwardly in the direction of arrow 502 (or downwardly in the direction of arrow 504) by rotating positioning member in the direction of arrow 526 (or the opposite direction of arrow 526). As shown in Figure marking point 550 of positioning member 500 is generally located in the longitudinal centerline of opening 2020.

FIGS. 6 and 7 schematically indicate that force in the direction of arrow 2070 is applied downwardly to the top of apparatus 100 causing marking point 550 to make a mark, indentation, scratch or scar 2550 on the top 2510 of the door 2500. To better assist in seeing the mark, indentation, scratch, or scar a different material 2700 can be placed on the top of the door 2500 (such as painter's tape or masking tape). During this step the front portion 310 of arm 300 is generally in a horizontal position and located in a horizontal plane between gape 2050.

Figure 8:
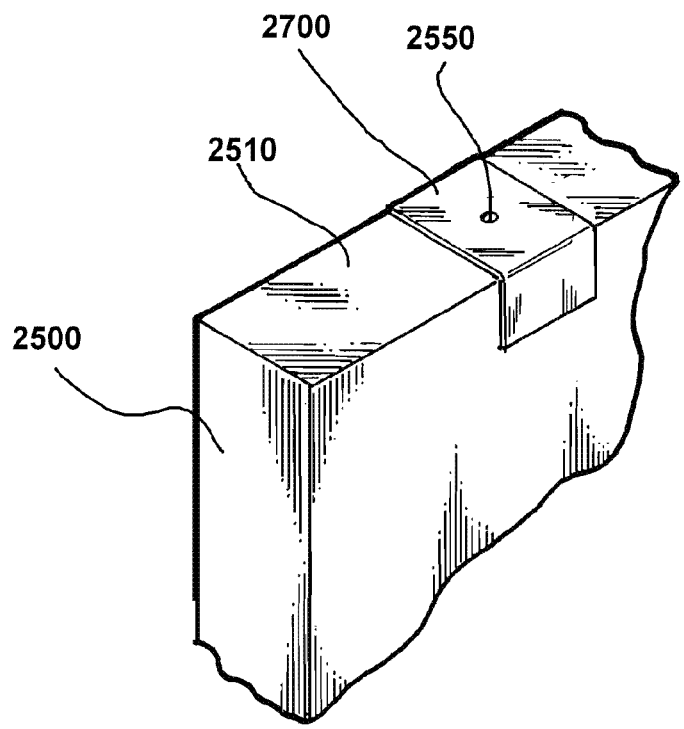
FIG. 8 shows mark placed on top of door.

FIG. 8 shows a point mark 2550 placed on top 2510 of door 2500, and on or through marking material 2700. Generally, two types of marks 2550 which can be left by marking point 550 (either a point mark or a scratch line). Point mark is shown, however, although not shown a scratch line 2560 ending in a point 2550 can be made where marking point 550 touches the top 2510 of the door 2500 when the door 2500 is being closed. This can occur when there is only a small gap 2050 between the top 2510 of the door and the header 2010 (i.e., the bottom of the door frame).

FIG. 8 shows a mark 2550 which can be left by marking point 550 when using tape 2700. In another embodiment tape 2700 can be omitted. Painter's tape 2700 can be used to better show the mark 2550 made by marking point 550 (shown in FIG. 7).

After mark 2550 is made in the top 2510 of door 2500, marking apparatus 100 can be removed (substantially the opposite procedure is used as that schematically shown in FIG. 6). A user pushes up (in the opposite direction of arrow 2070) on the bottom 304 of arm 300 and opens door 2500. Door 2500 can be opened and marking apparatus 100 pulled down from out of opening 2020 of header 2010 (substantially the opposite procedure as shown in FIG. 4). The user pulls out positioning member 500 from opening 2020 in the header 2010. Wire 20 will then be left hanging from opening 2020.

In one embodiment (shown in FIG. 1) the positioning member 500 is vertically adjustable relative to the arm 300 to address the situation where there are small gaps 2050 and minimize scarring or scratch lines 2560. To vertically adjust positioning member 500, positioning member 500 can be partially screwed into or unscrewed from arm 300, where threads 515 of positioning member 500 will move positioning member 500 up or down relative to arm 300.

Figure 9:
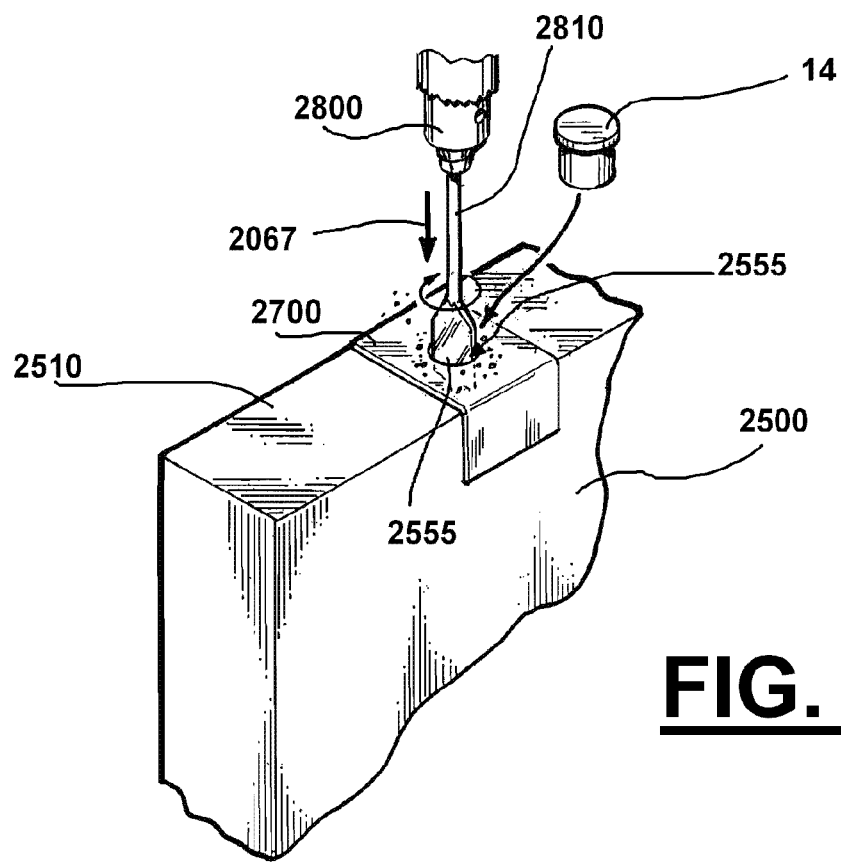
FIG. 9 shows a hole being drilled on top of door at mark and alarm sensor being placed in hole.

FIG. 9 shows a 2550 hole being drilled on top 2510 of door 2500 at mark 2550 and alarm sensor 14 being placed in the drilled hole 2555. The hole 2555 should be the size of the lower sensor 14 to be placed in the door 2510 and should be drilled parallel to a vertical plane passing through the mark 2550 on the top 2510 of the door 2500. FIG. 9 shows the hole 2550 being drilled through the painter's tape 2700. After the hole 2550 is drilled the painter's tape 2700 should be removed from door 2500.

F9 shows the lower sensor 14 being placed in the drilled hole 2555 at the top 2510 of the door 2500.

Figure 10:
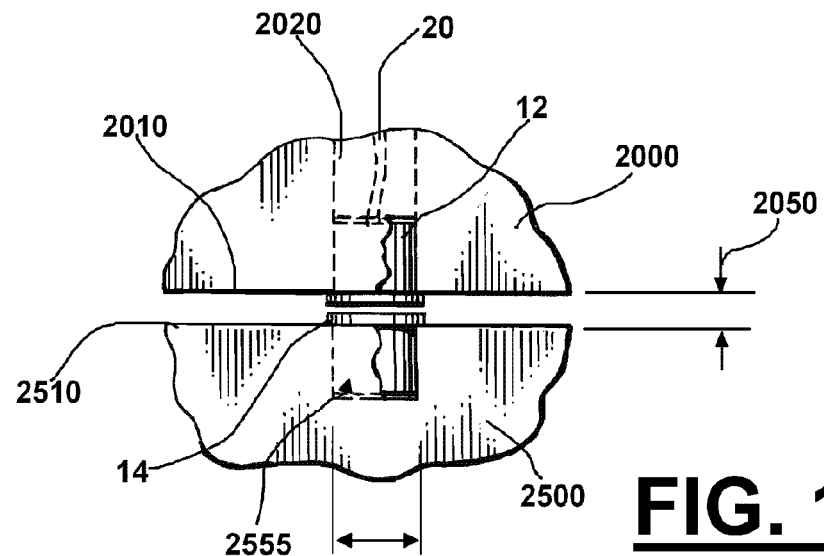
FIG. 10 shows upper and lower alarm sensors in an aligned position when door is closed.

FIG. 10 shows upper 12 and lower 14 alarm sensors in an aligned position when door 2500 is closed in door frame 2100.

FIG. 10 shows how the lower sensor 14 placed in the hole 2555 made in the door 2500 lines up well with the mating upper sensor 12 component connected to the wire 20 and placed in the hole 2020 in the header 2010 of the door frame 2000. The arrow in FIG. 9 schematically indicates alignment between upper 12 and lower 14 sensor components FIG. 10 should be contrasted with prior art manual methods of approximating the location of drill how 2555 (without using the marking apparatus 100) does not lines up the mating upper sensor 12 component.

Marking on Door Using Positioning Member with Pulling on Flexible Member

Figure 11:
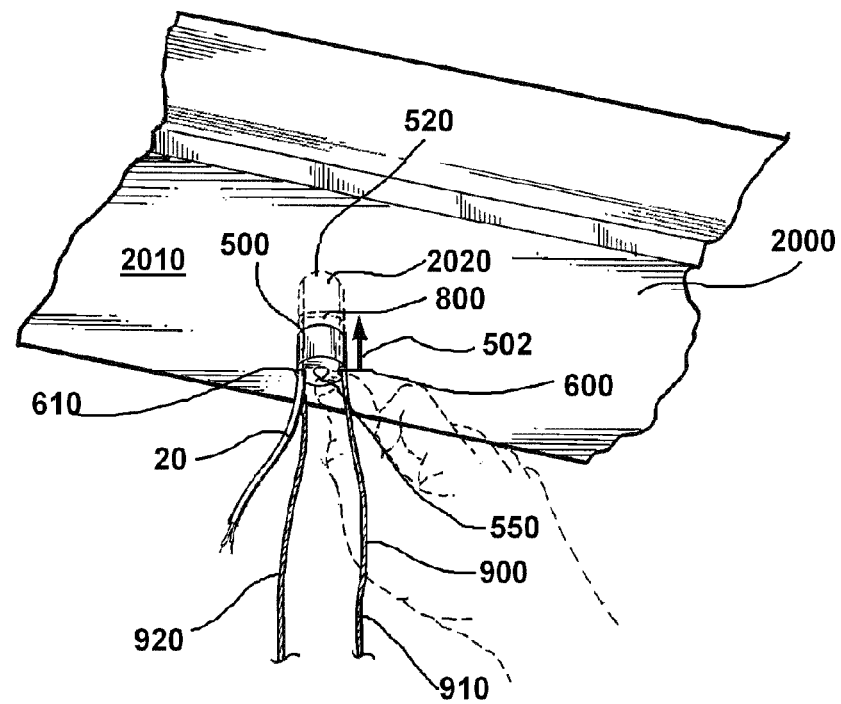
FIG. 11 shows positioning member (without handle) but with flexible member, and positioning member being placed in alarm sensor hole of top door frame with alarm sensor wire hanging down out of hole and with door open.

FIG. 11 shows positioning member 500 (without handle 300) but with force application system 900 (e.g., pull cord) being placed in alarm sensor hole 2020 of top 2010 door frame 2000 with alarm sensor wire 20 hanging down out of hole 2020 and with door 2500 open.

Figure 12:
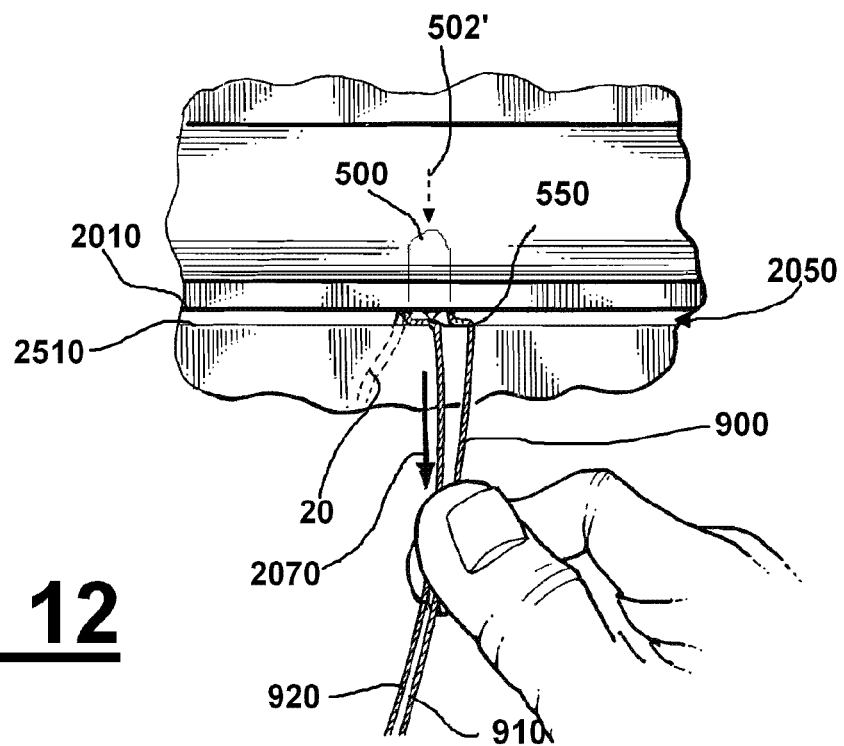
FIG. 12 shows door closed and the pull cord being used to apply force on the positioning member with marking tip, and with door closed.

FIG. 12 shows door 2500 closed and the force application system 900 (e.g., pull cord) being used to apply force (schematically indicated by arrow 2070) on the positioning member 500 with marking tip 550, and with door 2500 closed. In this embodiment flexible member 20 can have first and second ends 910 and 920 and threaded through bore 800.

Figure 13:
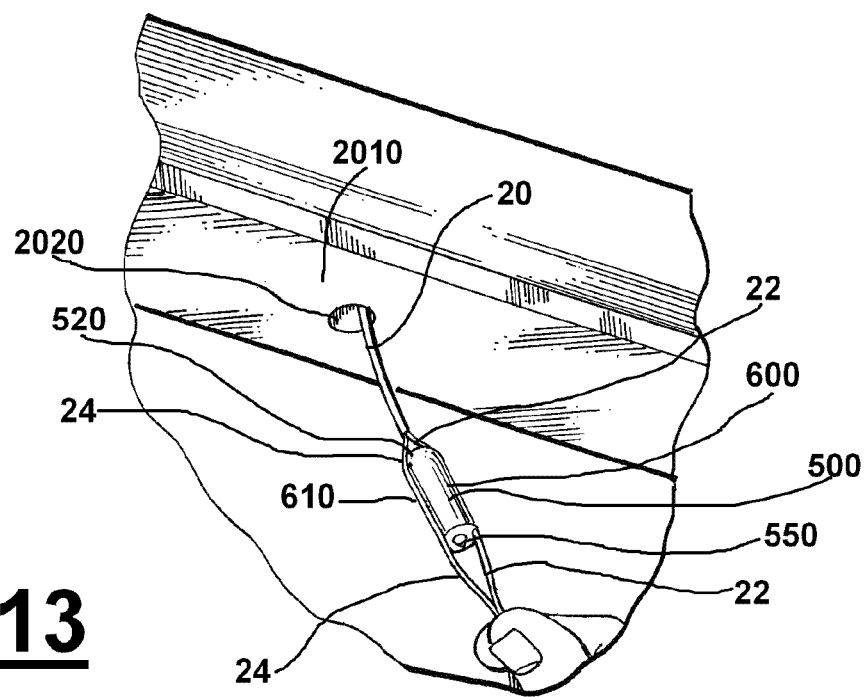
FIG. 13 shows door closed and the two wires of the alarm sensor wire which will be used to apply force on the positioning member with marking tip after the door is closed.

FIG. 13 shows door 2500 open and the two wires 22 and 24 of the alarm sensor wire 20 which will be used as flexible member 900 to apply force on the positioning member 500 with marking tip 550 after the door 2500 is closed (and similar to the method described for FIGS. 11 and 12).

General Methods of Marking on Doors

One embodiment provides a method and apparatus for marking positions for burglar alarm sensor elements on a door 2500, the door 2500 being attached to a frame 2000 comprising the steps of:

(a) providing a positioning member 500, the positioning member 500 having a longitudinal centerline and a marking point 550, the marking point 550 being aligned with the longitudinal centerline of the positioning member 500;

(b) at least partially opening the 500 door;

(c) placing the positioning member 500 in a hole 2020 in the frame 2000;

(d) while the positioning member is in hole 2020, closing the door 2500 in the door frame 2000;

(e) causing the marking 550 point to make a mark 2550 on the door 2500;

(f) opening the door 2500 and removing the positioning member 500 from the hole 2020 in the frame 2000; and (g) causing an opening 2555 to be made in the door 2500 at the location of the positioning mark 2550.

In one embodiment the door 2500 is pivotally connected to the frame 2000.

In one embodiment the door 2500 is slidably connected to the frame 2000 and the closing the door in the frame requires the door 2500 to slide parallel to the frame 2000 while the door 2500 is substantially parallel to the frame 2000.

In one embodiment the positioning member is attached to an arm 300 and in step "e" force is applied to the arm 300.

In one embodiment the positioning member is attached to a flexible member 900 and in step "e" force is applied to the flexible member 900.

In one embodiment the positioning member 500 includes a frictional element 3000. In one embodiment the frictional element 3000 includes is flexible and includes first and second ends 3010 and 3020.

In one embodiment the flexible member 900 is a rope, wire, chain, cord, or string.

In one embodiment the positioning member 500 includes a plurality of grooves 600 and 610 which are substantially parallel to the longitudinal centerline CL of the positioning member 500.

In one embodiment the frictional element 3000 at least partially occupies one of the grooves 600 and/or 610.

In one embodiment the positioning member 500 includes a bore 800 which is substantially perpendicular to the longitudinal centerline CL of the positioning member 500, and the flexible member 900 passes through the bore 800.

In one embodiment the and the frictional element 3000 passes through the bore 800.

Marking on Doors and Windows with Irregular Door/Window Jams

Sliding Glass Door

This embodiment is preferably used where arm 300 cannot be used for space reasons.

Figure 14:
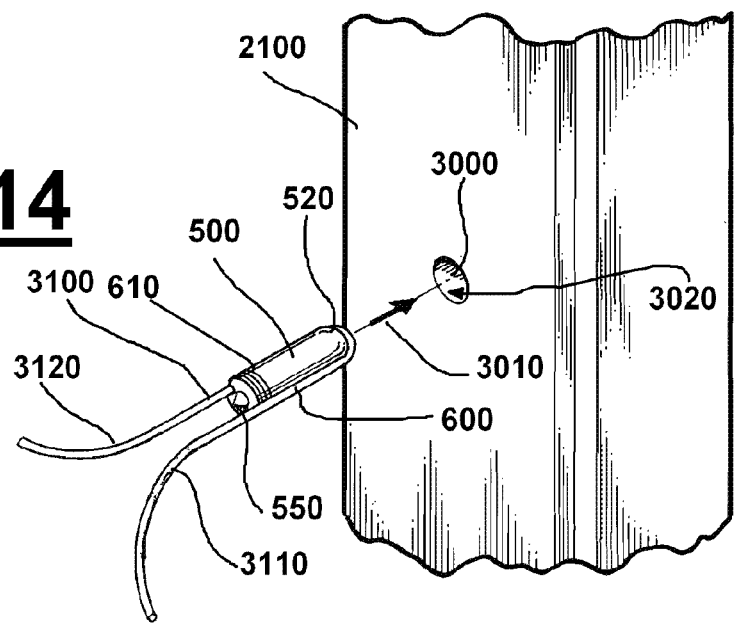
FIG. 14 shows positioning member with marking tip with short friction cord being placed in alarm sensor hole at side of door frame with short friction wire wrapped about positioning member and placed in grooves to make a frictional surface and prevent the member from being pushed completely into hole when door closed, with door open.

FIG. 14 shows positioning member 500 with marking tip 550 with short friction member 3000 being placed in alarm sensor hole 3020 at side of door frame with short friction member 3100 (e.g., enlarged diameter insulated wire—enlarged with respect to slots or grooves 600 and 610) wrapped about positioning member 500 (placed in groove 600 and 610, and wrapped around top 520) and placed in grooves 600,610 to make a frictional surface and prevent the positioning member 500 from being pushed completely into hole 3000 when door 3500 closed, with door 3500 open in FIG. 14 so not shown.

Figure 15:
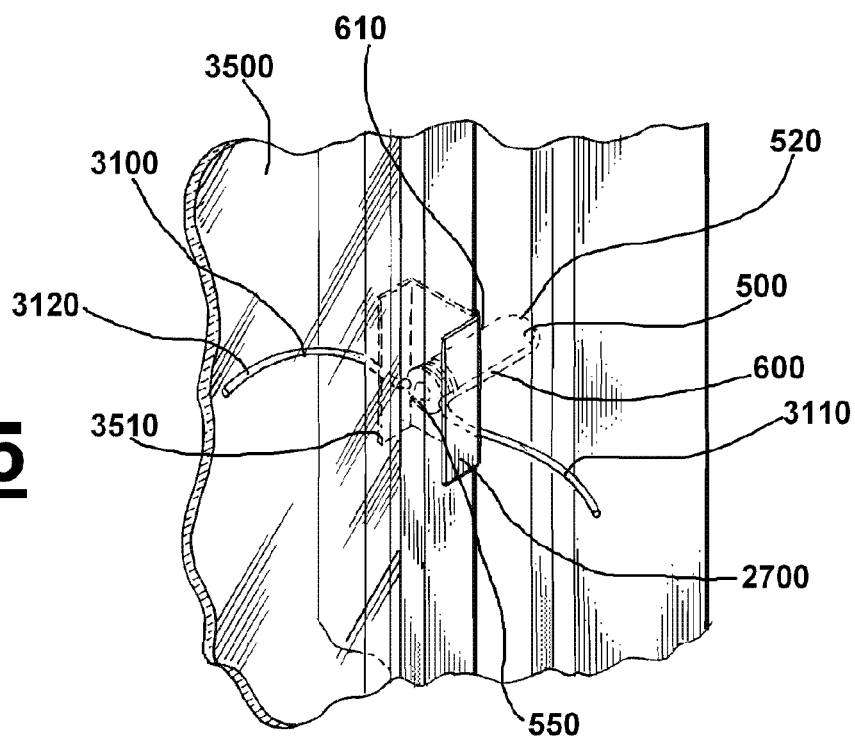
FIG. 15 shows the door after being closed on the positioning member of FIG. 14, wherein a mark can be made on side of closed door for an opening to be drilled for placement of alarm sensor component.

FIG. 15 shows door 3500 after being closed on the positioning member 500 of FIG. 14, wherein a mark can be made on side 3510 of closed door 3500 for an opening to be drilled in door 3500 for placement of alarm sensor component. The mark on door 3500 can be an indentation, scratch, or ink type mark. In FIG. 15 tape 2700 is used to better show the mark as door 3500 may be metal and not easily marked.

Window Sill

Figure 16:
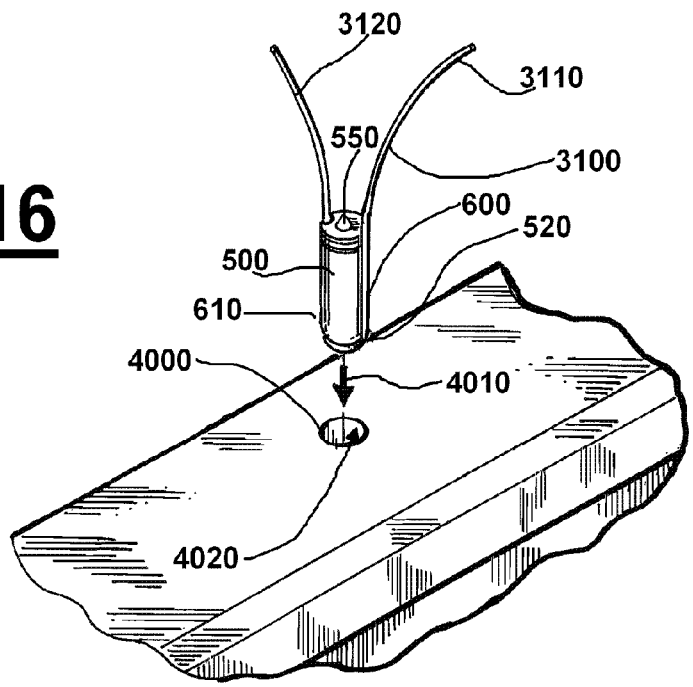
FIG. 16 shows positioning member with marking tip with short friction cord being placed in alarm sensor at bottom of window sill with short friction wire wrapped about positioning member and placed in grooves to make a frictional surface and prevent the positioning member from being pushed completely into hole when window closed, with window open.
Figure 17:
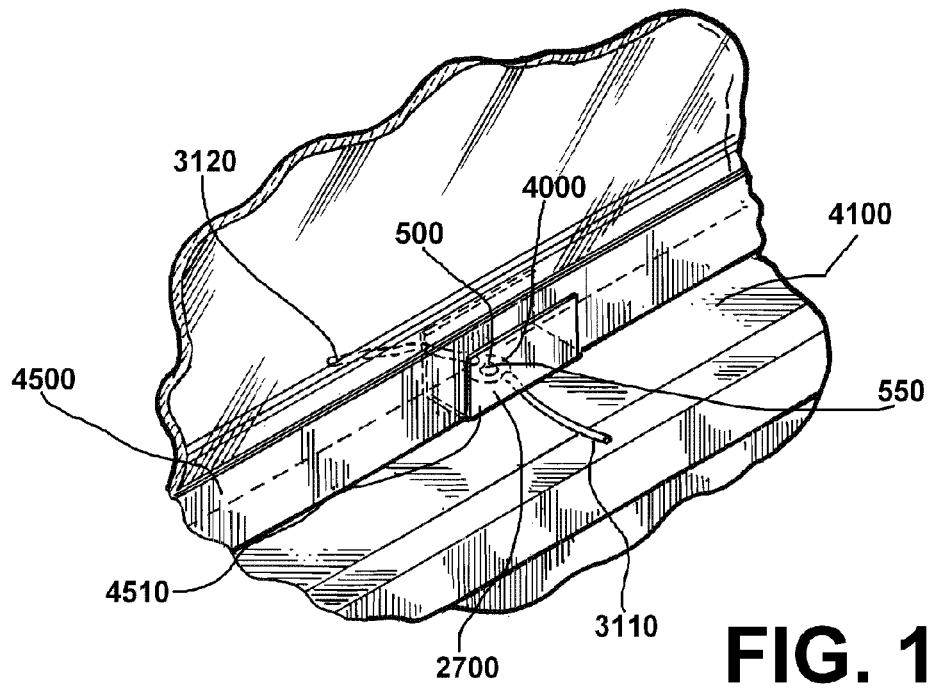
FIG. 17 shows the window after being closed on the positioning member of FIG. 16, wherein a mark can be made on side of closed window for an opening to be drilled for placement of alarm sensor component.

FIG. 16 shows positioning member 500 with marking tip 550 with short friction member 3000 being placed in alarm sensor hole 4020 at bottom of window sill 4000 with short friction member 3100 (e.g., enlarged diameter insulated wire—enlarged with respect to slots or grooves 600 and 610) wrapped about positioning member 500 (placed in groove 600 and 610, and wrapped around top 520) and placed in grooves 600,610 to make a frictional surface and prevent the positioning member 500 from being pushed completely into hole 3000 when window 4500 closed. In FIG. 17 tape 2700 is used to better show the mark as window 4500 may be metal and not easily marked.

FIG. 17 shows the window 4500 after being closed on positioning member 500, wherein a mark can be made on bottom 4510 of closed window 4500 for an opening to be drilled for placement of alarm sensor component. In FIG. 17 tape 2700 is used to better show the mark as window 4500 may be metal and not easily marked.

General Methods for Marking on Windows

This embodiment is preferably used where arm 300 cannot be used for space reasons.

One embodiment provides a method and apparatus for marking positions for burglar alarm sensor elements on a window 4500, the window 4500 being attached to a frame 4000 comprising the steps of:

(a) providing a positioning member 500, the positioning member having a longitudinal centerline and a marking point 550, the marking point 550 being aligned with the longitudinal centerline of the positioning member 500;

(b) at least partially opening the window 4500;

(c) placing the positioning member 500 in a hole 4020 in the frame 4000;

(d) while the positioning member 500 is in the hole 4020, closing the window 4500;

(e) causing the marking point 550 to make a positioning mark on the window 4500;

(f) opening the window 4500 and removing the positioning member 500 from the hole in the frame 4000; and (g) causing an opening to be made in the window 4500 at the location of the positioning mark.

In one embodiment the window 4500 is pivotally connected to the frame 4000.

In one embodiment the window 4500 is slidably connected to the frame 4000 and the closing the door in the frame requires the window 4500 to slide parallel to the frame 4000 while the window 4500 is substantially parallel to the frame 4000.

In one embodiment the positioning member 500 is attached to an arm 300 and in step "d" force is applied to the arm 300.

In one embodiment the positioning member 500 is attached to a flexible member 900 and in step "f" force is applied to the flexible member 900.

In one embodiment the positioning member 500 includes a frictional element 3100. In one embodiment the frictional element 3000 includes is flexible and includes first and second ends 3110 and 3120.

In one embodiment the flexible member 900 is a rope, wire, chain, cord, or string.

In one embodiment the positioning member 500 includes a plurality of grooves 600 and 610 which are substantially parallel to the longitudinal centerline CL of the positioning member 500.

In one embodiment the frictional element 3100 at least partially occupies one of the grooves 600 and/or 610.

In one embodiment the positioning member 500 includes a bore 800 which is substantially perpendicular to the longitudinal centerline CL of the positioning member 500, and the flexible member 900 passes through the bore 800.

In one embodiment the and the frictional element 3100 passes through the bore 800.

Door Strike and Latch Bore Drilling

Most manufacturers have predrilled the majority of doors for doorknobs (with cross bores and latch bores), and their measurements will be standard. One challenge with installing doors is to properly position the latch bore and/or the strike plate on the door frame. This is currently done with the installer approximating the aligned position of the strike plate.

Figure 18:
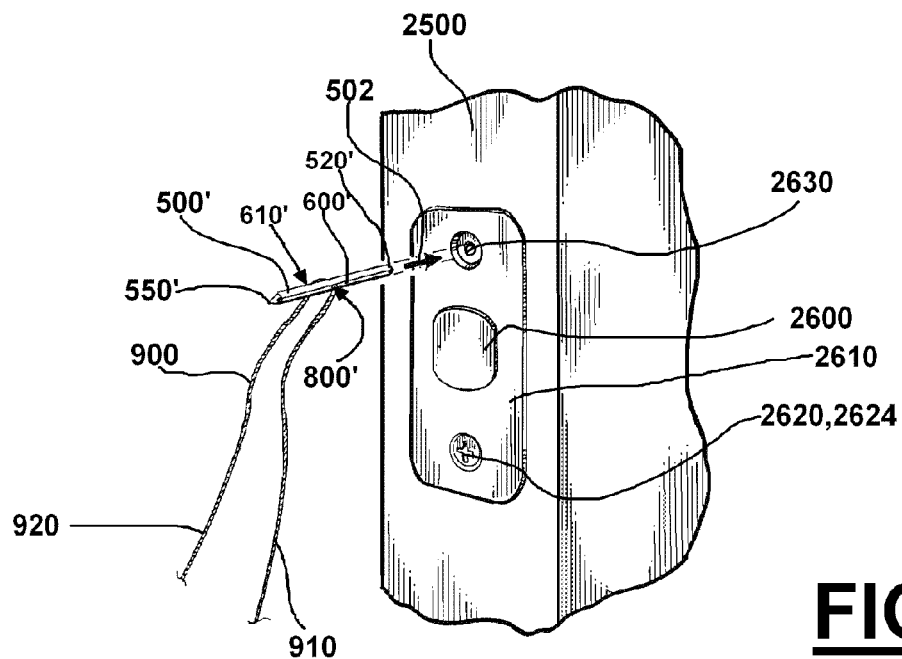
FIG. 18 shows a small diameter positioning member with marking tip with pull cord being placed in dead bolt screw hole at side of door (with screw for dead bolt removed), with door open. Small diameter positioning member can also be used/placed in a lock latch screw hole.

FIG. 18 shows a small diameter positioning member 500' with marking tip 550' with flexible member 900 being placed in dead bolt screw hole 2620 at side of door 2500 (with screw for dead bolt 2600 removed), with door 2500 open.

Figure 19:
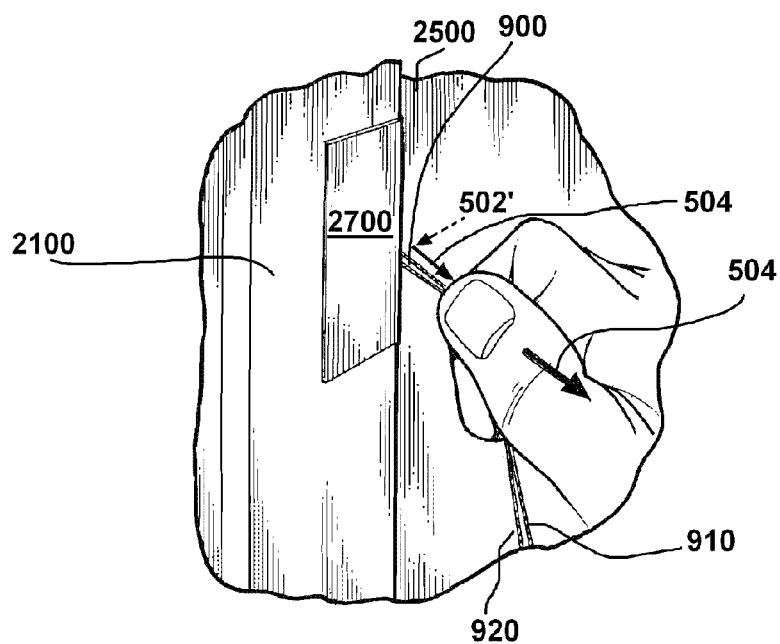
FIG. 19 shows door closed and the flexible member being used to apply force on the positioning member with marking tip to mark the door frame.

FIG. 19 shows door 2500 closed and the flexible member 900 being used to apply force (schematically indicated by arrow 504) on the positioning member 500' with marking tip 550' to mark the side 2100 of door frame 2000. Flexible member 900 is pulled on in the direction of arrow 504 putting force on positioning member 500' in the direction of arrow 502' causing marking tip 550' to mark side 2100 at marking position 2150 (shown in FIG. 20).

A similar procedure described in reference to FIGS. 18 and 19 can be used for making a second positioning mark 2154 (shown in FIG. 20), wherein positioning member 500' is placed in screw hole 2630 (with screw for dead bolt 2600 removed), door 2500 closed, and flexible member 900 is pulled on in the direction of arrow 504 putting force on positioning member 500' in the direction of arrow 502'.

Figure 20:
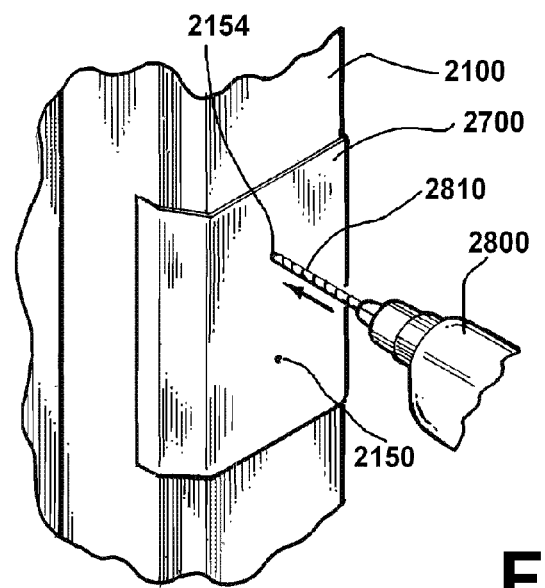
FIG. 20 shows the positioning marks made from the two screw holes of the dead bolt, where the positioning marks are made an a piece of tape to better show the location of the marks. Positioning marks can also be made from small diameter positioning member be used/placed in lock latch screw holes.

FIG. 20 shows the positioning marks 2150, 2154 made from the two screw holes 2620, 2630 of the dead bolt 2600, where the positioning marks 2150, 2154 are made on a piece of tape 2700 to better show the location of the marks.

Figure 21:
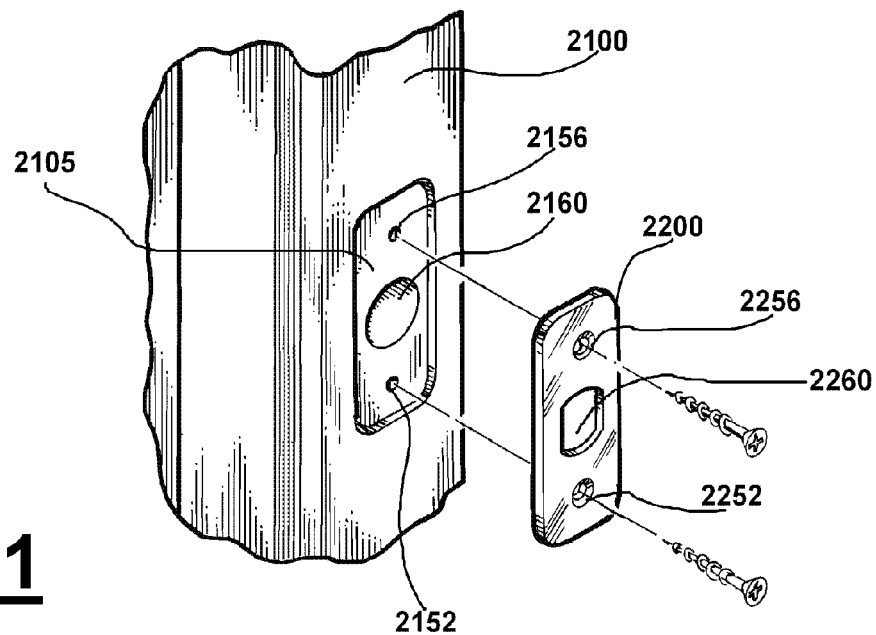
FIG. 21 shows a recessed area for the deadbolt plate make around the two holes drilled from the positioning marks made in FIG. 20, along with placement of strike plate and hole cut out for strike plate to match the dead bolt or door lock.

FIG. 21 shows a recessed area 2105 for the deadbolt plate 2260 made around the two holes drilled from the positioning marks 2150 and 2154 made in FIG. 20, along with placement of strike plate 2260 and hole 2160 cut out for strike plate 2160 to match the dead bolt 2600.

FIG. 22 shows a strike plate 2200' having screw holes 2252 and 2256 (schematically indicated as DIM. B) which do not match the screw holes 2620 and 2630 (schematically indicated as DIM.A) of the latch 2600. In such a case a template 2400 can be used.

FIG. 23 shows a strike plate template 2400 which can be used when the strike plate holes 2252 and 2256 (schematically indicated as DIM. B) do not match the screw holes 2620 and 2630 (schematically indicated as DIM.A) of the latch 2600. In such a case one or both of template holes 2410 and 2420 of template 2400 can be aligned with one or both of positioning marks 2150, 2154 made from the two screw holes 2620, 2630 of the dead bolt 2600.

Figure 24:
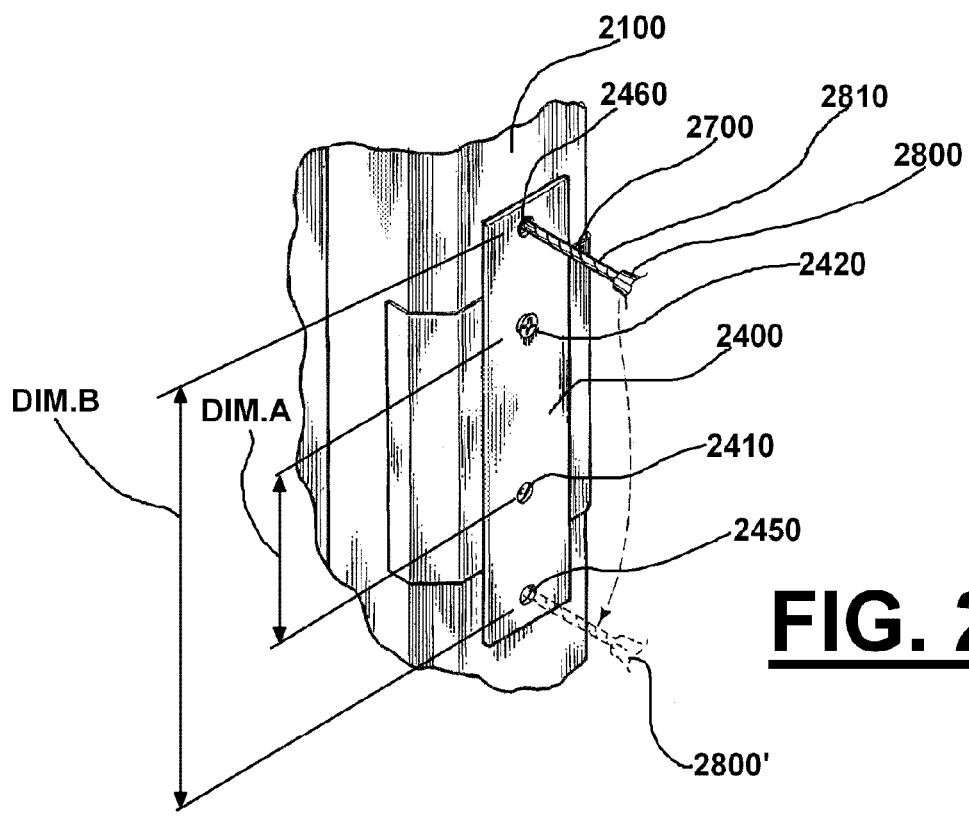
FIG. 24 shows the template of FIG. 23 placed on the door and drill holes being made for the strike plate.

FIG. 24 shows template 2400 being placed on side 2100 of frame 2000 and drill holes being made through template holes 2450 and 2460 for affixing strike plate 2200' to side 2100 of frame 2000.

Figure 25:
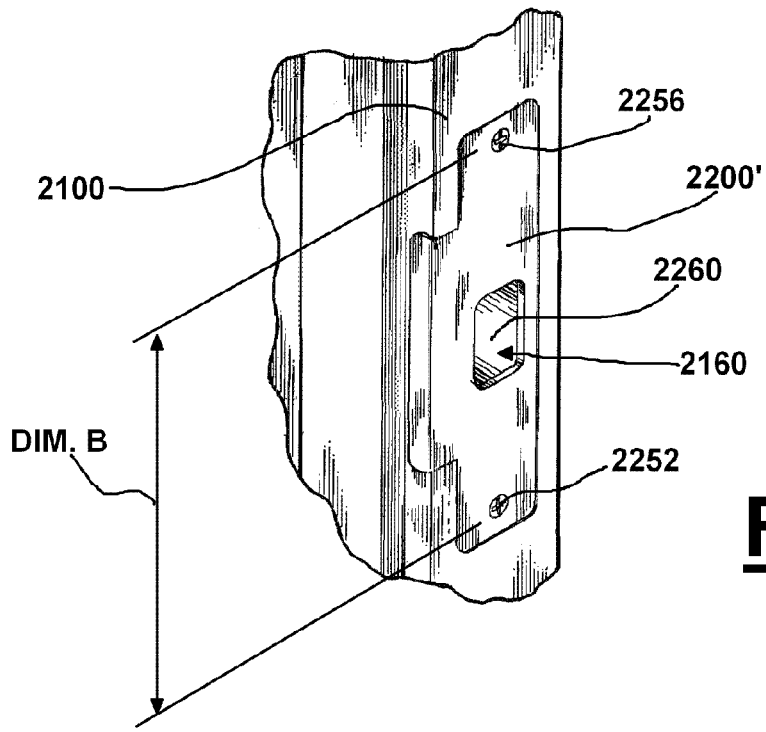
FIG. 25 shows a recessed area for the strike plate made around the two holes drilled from the positioning template of FIG. 24, along with placement of strike plate and hole cut out for strike plate to match a latch, deadbolt, or door lock.

FIG. 25 shows a recessed area for strike plate 2200' made around the two holes drilled from the positioning template 2400, along with placement of strike plate 2200' and hole 2260 cut out for strike plate to match the latch 2600. Strike plate bore 2260 can be milled or drilled around screw holes from 2450 and 2460 for alignment with latch 2600. FIG. 25 shows the strike plate 2200' after being installed on side 2100 of door frame 2000 (which is aligned with latch 2600).

One embodiment provides a method and apparatus for marking positions for receiving or strike plates on door frame 2000, the door being attached to a frame comprising the steps of:

(a) providing a first marking apparatus 500 the first marking apparatus including a first marking point 550, (b) placing the first marking apparatus 500 in a first opening 2630 for a latch or deadbolt mechanism for the door 2500;

(c) while the first marking apparatus 500 is in the first opening 2630, closing the door 2500 in the door frame 2000;

(d) while the door 2500 is closed, applying force on the first marking apparatus 500 causing it to place a mark 2156 on the side 2100 of door frame 2000;

(e) opening the door 2500 and removing the first marking apparatus 500 from the door; and (f) using the first positioning mark 2156 to install a plate 2200 on the door frame 2000 for receiving the latch or dead bolt.

One embodiment includes the further steps of: after step "e" placing the first marking apparatus 500 in a second opening 2620, closing the door 2500, and while the door is closed, applying force on the first marking apparatus 500 causing it to place a second mark 2150 on the side 2100 of door frame 2000 for a latch or deadbolt mechanism, and during step "f" using both the first and second positioning marks 2156 and 2150 to install plate 2200.

One embodiment provides a method and apparatus for marking positions for receiving or strike plates on door frame 2000, the door being attached to a frame comprising the steps of:

(a) providing a first marking apparatus 500 the first marking apparatus including a first marking point 550, and providing a second marking apparatus 500', the second marking apparatus including a second marking point 550;

(b) placing the first marking apparatus 500 in a first opening 2630 for a latch or deadbolt mechanism for the door 2500, and placing the second marking apparatus 500' in a second opening 2620 for a latch or deadbolt mechanism for the door 2500;

(c) while the first marking apparatus 500 is in the first opening 2630 and the second marking apparatus 500' in a second opening 2620, closing the door 2500 in the door frame 2000;

(d) while the door 2500 is closed, applying force on the first marking apparatus 500 causing it to place a mark 2156 on the side 2100 of door frame 2000;

(e) while the door 2500 is closed, applying force on the second marking apparatus 500' causing it to place a mark 2150 on the side 2100 of door frame 2000;

(f) opening the door 2500 and removing the first and second marking apparatuses 500, 500' from the door; and (f) using the first and second positioning marks 2156, 2150 to install a plate 2200 on the door frame 2000 for receiving the latch or dead bolt.

In any of the above embodiments a positioning template 2400 can be used with either the first or second positioning 2156, 2150 marks to install the plate 2200 on the door frame 2000.

The following is a list of reference numerals suitable for use in the present invention.

REFERENCE NUMERAL LIST

| Reference Number | Description |
|---|---|
| 10 | door sensor |
| 12 | frame portion of sensor |
| 14 | door portion of sensor |
| 20 | wire |
| 22 | first wire |
| 24 | second wire |
| 100 | marking apparatus |
| 200 | handle |
| 300 | arm |
| 302 | top side |
| 304 | bottom side |
| 310 | first end |

REFERENCE NUMERAL LIST (continued)

| Reference Number | Description |
|---|---|
| 320 | second end |
| 350 | opening |
| 355 | threaded area |
| 360 | notch or slot |
| 370 | bend or angle |
| 380 | covering |
| 500 | positioning member |
| 510 | first end |
| 515 | threaded area |
| 520 | second end |
| 522 | arrow |
| 524 | arrow |
| 526 | arrow |
| 530 | positioning surface |
| 532 | positioning surface |
| 534 | positioning surface |
| 550 | pointed area |
| 555 | longitudinal centerline |
| 600 | groove |
| 610 | groove |
| 620 | groove |
| 700 | punch |
| 800 | opening |
| 810 | first end |
| 820 | second end |
| 900 | flexible member (e.g., cord/wire/string/rope/chain) |
| 910 | first end |
| 920 | second end |
| 1000 | positioning member |
| 1005 | bore (threaded) |
| 1010 | first end |
| 1020 | second end |
| 1030 | positioning surface |
| 1040 | rounded area |
| 1050 | fastener |
| 1051 | tip of fastener |
| 1070 | threaded area |
| 1100 | adjustable punch |
| 1110 | first end |
| 1115 | notched end |
| 1120 | second end |
| 1150 | threaded portion |
| 1155 | tip |
| 2000 | door frame |
| 2004 | weather stripping |
| 2006 | door jam |
| 2010 | header |
| 2020 | opening |
| 2050 | gap |
| 2070 | arrow |
| 2072 | arrows |
| 2074 | plane |
| 2080 | arrow |
| 2084 | arrow |
| 2100 | side |
| 2105 | original strike plate bore |
| 2107 | modified strike plate bore |
| 2110 | strike plate bore |
| 2150 | mark |
| 2160 | strike plate bore |
| 2200 | strike plate |
| 2400 | template |
| 2410 | positioning opening |
| 2420 | positioning opening |
| 2450 | positioning opening |
| 2460 | positioning opening |
| 2500 | door |
| 2504 | door knob |
| 2510 | top |
| 2520 | opening |
| 2530 | opening |
| 2550 | mark |
| 2555 | hole |
| 2560 | scar mark |
| 2600 | door locking member |
| 2610 | plate |
| 2620 | first opening |
| 2624 | first screw |
| 2630 | second opening |
| 2634 | second screw |
| 2700 | tape |
| 2800 | drill |
| 2810 | drill bit |
| 3000 | opening |
| 3010 | arrow |
| 3100 | frictional insert |
| 3110 | first end |
| 3120 | second end |
| 3500 | door |
| 3510 | marking tape/sticker |
| 4000 | window |
| 4010 | opening |
| 4020 | side |
| 4100 | sill |
| 4500 | window |
| 4510 | marking tape/sticker |

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A method of installing a latch or door plate on a door frame attached to a door, comprising the steps of:
   (a) providing a positioning member, the positioning member having a longitudinal centerline and a marking point, the marking point being aligned with the longitudinal centerline of the positioning member;
   (b) partially opening the door;
   (c) placing the positioning member in a hole in the door;
   (d) while the positioning member is in the hole, closing the door in the door frame;
   (e) while the door is closed in the door frame, applying force on the positioning member to cause the marking point of the positioning member to make a positioning mark on the frame;
   (f) after step "e", opening the door and removing the positioning member from the hole in the door; and
   (g) after step "e", using the mark made in step "e" as a basis for installing the latch or door plate on the frame.

2. The method of claim 1, wherein before step "e" a marking material is placed on the door frame to assist in seeing, and during step "e" the positioning mark is made on the marking material.

3. The method of claim 2, wherein after step "e" the marking material is removed from the door frame.

4. The method of claim 2, wherein the marking material is tape.

5. The method of claim 2, wherein the marking material is comprised of a different material from the door frame.

6. The method of claim 1, wherein in step "c" the hole in the door is one of a plurality of holes for receiving screws which will be used to connect a door locking member to the door.

7. The method of claim 6, wherein the positioning member has a diameter and the diameter is less than the diameter of the screws used to attach the door locking member to the door.

8. The method of claim 1, further comprising the steps of:
   (h) providing a second positioning member, the positioning member having a longitudinal centerline and a marking point, the marking point being aligned with the longitudinal centerline of the positioning member;
   (i) partially opening the door;
   (j) placing the second positioning member in a second hole in the door;
   (k) while the second positioning member is in the second hole, closing the door in the door frame;
   (l) while the door is closed in the door frame, applying force on the second positioning member to cause the marking point of the second positioning member to make a second positioning mark on the frame;
   (m) after step "l", opening the door and removing the second positioning member from the second hole in the door; and
   (n) after step "l", using the second mark made in step "l" and the mark made in step "e" as a basis for installing the latch or door plate on the frame.

9. The method of claim 8, wherein before step "l" a marking material is placed on the door frame to assist in seeing, and during step "l" the positioning mark is made on the marking material.

10. The method of claim 9, wherein after step "n" the marking material is removed from the door frame.

11. The method of claim 9, wherein the marking material is tape.

12. The method of claim 8, wherein in step "j" the second hole in the door is one of a plurality of holes for receiving screws which will be used to connect a door locking member to the door.

13. The method of claim 12, wherein the second positioning member has a second diameter and the second diameter is less than the diameter of the screws used to attach the door locking member to the door.

14. The method of claim 8, wherein in step "g" a first hole is drilled into the frame at the location of the mark made in step "e", and in step "n" a second hole is drilled into the frame at the location of the second mark made in step "n".

15. The method of claim 8, wherein in step "g" a first hole is drilled into the frame at a first location spaced apart from the mark made in step "e", in step "n" a second hole is drilled into the frame at a second location spaced apart from the second mark made in step "n", and no holes are drilled in the mark and second mark.

16. The method of claim 15, wherein the spacing apart between the first hole and the mark, and the spacing between the second hole and the second mark are the same.

* * * * *